United States Patent Office 2,990,312
Patented June 27, 1961

2,990,312
PROCESS OF MAKING LAMINATES FROM PAPER IMPREGNATED WITH A MELAMINE-FORMALDEHYDE RESIN CONTAINING A BUFFERING AGENT
Chien Fan Chu, Melrose Park, Ill., assignor to The Richardson Company, Melrose Park, Ill., a corporation of Ohio
No Drawing. Filed July 1, 1957, Ser. No. 668,887
7 Claims. (Cl. 154—138)

This invention relates to industrial laminates and more particularly to laminates derived from melamine formaldehyde resin.

As is well known to those familiar with the electrical and electronic industries, synthetic laminates, which are board-like in character, have become widely accepted for use as insulation media and component supports. Such laminates can usually be formed with a variety of properties, both electrical and physical, depending on their end use.

Synthetic laminates are normally made by first impregnating a filler sheet with an appropriate varnish containing a heat-curable resin such as a phenol resin or a melamine resin. After impregnation of a filler sheet, a plurality of such sheets are assembled or superimposed to form a build-up, the build-up then being placed between platens of a hydraulic press and subjected to heat and pressure whereby the resin is cured and the whole consolidated into the aforementioned board-like structure. Melamine formaldehyde resin is customarily used in the formation of laminates when improved flame retardancy and arc resistance properties are desired in the finished product.

One disadvantage of melamine formaldehyde resin is that it cures rather rapidly to a hard, brittle condition resulting in a laminate which is difficult to fabricate. Thus, when laminates formed from melamine formaldehyde resin are subjected to a punching operation, even at elevated temperatures, it will be found, in general, that the laminates will chip or crack around the area punched, hence, the utility of such laminates is somewhat limited. Accordingly, while melamine formaldehyde resin offers certain advantages, it cannot be employed as freely as would often be desired.

It is one of the objects of this invention therefore to improve the fabricating properties of laminates made from melamine formaldehyde resins without otherwise affecting their properties.

Another object of the invention is to provide means for controlling the cure of melamine formaldehyde resins.

A still further object is to accomplish the foregoing at a negligible increase in cost.

In studying the cure of melamine formaldehyde resins, it was noted that, if the resin is cured in an acid medium, the rate of cure is quite fast, whereby the resin rapidly attains its final hard brittle condition. On the other hand, if such resins are cured in an alkaline medium, they have a tendency to cure somewhat less rapidly but such a cure cannot give adequate control to insure desired fabricating properties in a laminate. For fabricating purposes it is desirable that such resins cure to a hardened condition but not to the ultimate stage. From investigations made it was noted that the natural pH of melamine formaldehyde varnish was in the range of about 9.1 to 9.5. However, it was also noted that even an initial high alkaline pH was not sufficient to provide adequate cure control, probably due to the fact that, as the cure progresses, the pH decreases. In line with this theory buffering agents were added to varnishes containing melamine formaldehyde resin, such as borax (sodium borate) and mixtures of borax and boric acid. Varying amounts of buffering agents were employed extending from a trace up to 10%, based on the weight of the resin.

By observing a series of cures of laminates impregnated with melamine formaldehyde varnishes containing such buffering agents, it was concluded that the pH of the resin was maintained substantially at the level of that of the original varnish and that, in addition, for equal cure times the laminates formed were not cured to such a hard brittle condition as were laminates made from varnishes which did not contain a buffer. As a result of this work, cures for melamine formaldehyde resins were realized which could be utilized in laminate production to give markedly increased fabricating properties in that such laminates can be readily punched at lower temperature levels without developing the customary cracks and chips.

Melamine formaldehyde varnishes used to impregnate filler sheets to form laminates usually comprise a resin, alcohol and water mixture. Such a solution has been found best suited to obtain satisfactory impregnation of a filler stock.

Improved fabricating properties were obtained with laminates using melamie formaldehyde varnishes wherein the original varnish contained between 0.5 to 5.0 percent borax, based on the weight of the resin present with a preferred range of 0.8 to 1.0 percent. For purposes of testing the phenomena, laminates were made using Hurlbut Paper Company 504 ten mil paper and Melamine 405 resin, which is an unfilled melamine formaldehyde available from the American Cyanamid Company. Similar cellulosic or other fillers and resins can likewise be used depending on the availability, properties desired, etc. In order to impregnate the paper filler, a varnish was made comprising 45 parts of resin, 38.5 parts of water and 16.5 parts alcohol, all parts being by weight. To this varnish there was added varying amounts of borax. The mixing procedure used consisted of dissolving the borax in a small amount of hot water, adding this solution to the alcohol together with additional water, and then adding the resin with agitation. Laminates were usually formed from a plural sheet build-up for a given thickness which was subjected to a pressure in the neighborhood of 1000 pounds per square inch at maximum temperatures of about 280° F. to 290° F., the total heating cycle being about 50 to 70 minutes.

The following data illustrates results obtained when laminates were made without using borax and using borax in amounts falling within the aforementioned ranges:

| Thickness, Inches | Borax, Percent Resin | Cure, Min. | Punching Temp., ° F. | | | | |
|---|---|---|---|---|---|---|---|
| | | | 175 | 200 | 225 | 250 | 275 |
| 1/16 | 0 | 60 | X | X | X | X | X |
| 1/16 | 0 | 70 | X | X | X | X | X |
| 1/16 | 2.57 | 60 | X | | | | |
| 1/16 | 2.57 | 70 | X | X | | | |
| .053 | 0.8 | 60 | X | | | | |
| .053 | 0.8 | 70 | X | | | | |
| .052 | 1.28 | 60 | X | | | | |
| .052 | 1.28 | 70 | X | | | | |

In the above table, "X" indicates that the laminate, when heated to the temperatures shown, resulted in unsatisfactory punching qualities by the appearance of chips or cracks. In testing the laminates a punching die was used which was of the type specified in ASTM specification D617–44. It will be observed from the foregoing data that laminates made from an impregnating varnish not containing borax could be heated to 275° F., an appreciable temperature to obtain softening, without any improvement in fabricating properties. Correspondingly, in those cases wherein the laminate was formed from a melamine varnish containing borax, it was generally only necessary to heat such laminates to about 200° F. to obtain a desired punching temperature without causing the customary chips and cracks.

Actually, fabricating temperatures vary to a certain extent depending upon the thickness of the stock. Thus a laminate 1/16 of an inch thick should be heated to about 225° F. to obtain desired fabricating qualities while a laminate 1/32 of an inch thick may be heated to as low a temperature as 175° F. to obtain the desired fabricating properties. Larger laminates, that is laminates thicker than 1/16 of an inch, will generally require slightly higher temperatures before obtaining desired fabricating properties. For example, laminates of approximately 3/32 of an inch thick were found to be easily punched at temperatures beginning at about 240° F.

In the foregoing discussion, attention has been focused on laminates formed using only varnishes containing melamine formaldehyde, which resin, as indicated, gives, desired flame and arc properties. However, for certain applications it is desirable to have other properties available, and, accordingly, the principles of this invention are applicable to modified laminates. For example, laminates made from straight melamine formaldehyde resins in some cases have a tendency to warp and, hence, it has been found that less warpage can be obtained if phenolic resins are also used to impregnate and coat the filler sheets. Further, phenolic resins improve certain of the electrical characteristics of laminates, such as their insulation resistance and dielectric constant. Typical phenolic resins are reaction products of phenol, cresylic acid, xylenols and mixtures thereof with formaldehyde.

The teachings of this invention, therefore, are adaptable for use in the manufacture of modified laminates of the foregoing type wherein a filler sheet is first impregnated with a melamine formaldehyde varnish containing a buffer followed by subjecting the impregnated sheet to a second coating operation using a varnish containing a phenolic resin.

While I have disclosed certain exemplary illustrations of the invention, the same is only intended to be limited by the scope of the following claims.

I claim:
1. A process of making a synthetic, board-like laminate comprising the steps of impregnating a filler sheet with a heat-curable melamine formaldehyde resin varnish having a minimum pH of about 9 and containing a buffering agent in an amount which is sufficient to maintain the pH of the resinous composition at substantially its initial level during cure, forming an assembly of superimposed impregnated filler sheets, and consolidating said assembly into an integral unit by heat and pressure.

2. A process as described in claim 1 wherein said buffering agent is sodium borate in an amount of between 0.5 to 5.0 percent by weight based on the weight of the resin.

3. A process as described in claim 1 wherein said buffering agent is sodium borate in an amount of between about 0.8 to 1.0 percent by weight based on the weight of the resin.

4. A process of making a synthetic, board-like laminate comprising the steps of impregnating a cellulosic filler sheet with a heat-curable melamine formaldehyde resin varnish having a minimum pH of about 9 and containing a buffering agent in an amount which is sufficient to maintain the pH of the resinous composition at substantially its intitial level during cure, forming an assembly of superimposed impregnated filler sheets and consolidating said assembly into an integral unit by heat and pressure.

5. A process as described in claim 4 wherein said buffering agent is sodium borate in an amount of between 0.5 to 5.0 percent by weight based on the weight of the resin.

6. A process as described in claim 4 wherein said buffering agent is sodium borate in an amount of between about 0.8 to 1.0 percent by weight based on the weight of the resin.

7. A process of making a synthetic, board-like laminate comprising the steps of impregnating a paper filler sheet with a heat-curable melamine formaldehyde resin varnish having a pH within the range of about 9.1 to 9.5 and containing sodium borate as a buffering agent in an amount which is sufficient to maintain the pH of the resinous composition at substantially its initial level during cure, forming an assembly of superimposed impregnated paper filler sheets and consolidating said assembly into an integral unit by heat and pressure.

References Cited in the file of this patent

UNITED STATES PATENTS

| | | |
|---|---|---|
| 2,060,122 | Ripper | Nov. 10, 1936 |
| 2,439,929 | Hill et al. | Apr. 20, 1948 |
| 2,484,599 | Weisberg et al. | Oct. 11, 1949 |
| 2,571,343 | Dailey et al. | Oct. 16, 1951 |